(12) United States Patent
Ragunathan

(10) Patent No.: US 11,518,344 B2
(45) Date of Patent: Dec. 6, 2022

(54) VEHICULAR SECURITY SYSTEM WITH BIOMETRIC AUTHORIZATION FEATURE

(71) Applicant: Magna Electronics Inc., Auburn Hills, MI (US)

(72) Inventor: Arun Prakash Ragunathan, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 17/301,386

(22) Filed: Apr. 1, 2021

(65) Prior Publication Data

US 2021/0309182 A1 Oct. 7, 2021

Related U.S. Application Data

(60) Provisional application No. 63/003,511, filed on Apr. 1, 2020.

(51) Int. Cl.

| | |
|---|---|
| *B60R 25/25* | (2013.01) |
| *B60R 25/30* | (2013.01) |
| *B60R 25/01* | (2013.01) |
| *G07C 9/00* | (2020.01) |
| *G07C 9/37* | (2020.01) |
| *G06V 20/59* | (2022.01) |

(52) U.S. Cl.
CPC .............. *B60R 25/25* (2013.01); *B60R 25/01* (2013.01); *B60R 25/305* (2013.01); *G06V 20/59* (2022.01); *G07C 9/00309* (2013.01); *G07C 9/37* (2020.01); *B60R 2325/205* (2013.01); *G07C 2009/00984* (2013.01)

(58) Field of Classification Search
None
See application file for complete search history.

(56) References Cited

U.S. PATENT DOCUMENTS

| | | | |
|---|---|---|---|
| 7,914,187 | B2 | 3/2011 | Higgins-Luthman et al. |
| 9,405,120 | B2 | 8/2016 | Graf et al. |
| 10,017,114 | B2 | 7/2018 | Bongwald |
| 10,065,574 | B2 | 9/2018 | Tiryaki |
| 10,071,687 | B2 | 9/2018 | Ihlenburg et al. |
| 10,099,614 | B2 | 10/2018 | Diessner |
| 10,453,282 | B2 * | 10/2019 | Dhillon .............. G07C 9/00563 |

(Continued)

*Primary Examiner* — Carlos Garcia
(74) *Attorney, Agent, or Firm* — Honigman LLP

(57) ABSTRACT

A vehicular security system includes a remote device with a first biometric sensor. An electronic control unit (ECU) of a vehicle processes data captured by the first biometric sensor to determine whether an identity of the user of the remote device matches an authorized user of the vehicle. The ECU, responsive to determining that the user is authorized to use the vehicle, unlocks a door of the vehicle to allow the identified authorized user to access the vehicle. The system includes a second biometric sensor disposed in the vehicle and, with the identified authorized user in the vehicle, the ECU, via processing data captured by the second biometric sensor, determines whether the identity of the identified authorized user of vehicle matches an authorized operator of the vehicle. The ECU, responsive to determining that the user is an authorized operator of the vehicle, allows operation of the vehicle.

19 Claims, 2 Drawing Sheets

(56) References Cited

U.S. PATENT DOCUMENTS

| | | | |
|---|---|---|---|
| 2006/0082437 A1* | 4/2006 | Yuhara | B60R 25/04 |
| | | | 340/5.82 |
| 2014/0329513 A1* | 11/2014 | Jacob | H04M 1/72463 |
| | | | 455/418 |
| 2014/0336876 A1 | 11/2014 | Gieseke et al. | |
| 2015/0009010 A1 | 1/2015 | Biemer | |
| 2015/0015710 A1 | 1/2015 | Tiryaki | |
| 2015/0022664 A1 | 1/2015 | Pflug et al. | |
| 2015/0092042 A1 | 4/2015 | Fursich | |
| 2015/0232030 A1 | 8/2015 | Bongwald | |
| 2015/0294169 A1 | 10/2015 | Zhou et al. | |
| 2015/0296135 A1 | 10/2015 | Wacquant et al. | |
| 2015/0352953 A1 | 12/2015 | Koravadi | |
| 2016/0137126 A1 | 5/2016 | Fursich et al. | |
| 2016/0209647 A1 | 7/2016 | Fursich | |
| 2017/0217367 A1 | 8/2017 | Pflug et al. | |
| 2017/0274906 A1 | 9/2017 | Hassan et al. | |
| 2018/0222414 A1 | 8/2018 | Ihlenburg et al. | |
| 2018/0354363 A1* | 12/2018 | Rolfes | B60K 28/12 |
| 2020/0143560 A1 | 5/2020 | Lu et al. | |
| 2020/0202151 A1 | 6/2020 | Wacquant | |
| 2020/0226355 A1* | 7/2020 | el Kaliouby | G16H 30/40 |
| 2020/0307519 A1* | 10/2020 | Takada | G07C 9/00563 |

\* cited by examiner

VEHICULAR SECURITY SYSTEM WITH BIOMETRIC AUTHORIZATION FEATURE

CROSS REFERENCE TO RELATED APPLICATION

The present application claims the filing benefits of U.S. provisional application Ser. No. 63/003,511, filed Apr. 1, 2020, which is hereby incorporated herein by reference in its entirety.

FIELD OF THE INVENTION

The present invention relates generally to a vehicle security system for a vehicle and, more particularly, to a vehicle vision system that utilizes one or more biometric sensors.

BACKGROUND OF THE INVENTION

Modern vehicles are typically unlocked with either a key or a remote key fob. A remote key fob may unlock the vehicle when the user actuates a button on the remote or places his hand on a door handle of the vehicle.

SUMMARY OF THE INVENTION

The present invention provides a vehicular security system that includes a remote device with a first biometric sensor. The system includes an electronic control unit (ECU) with electronic circuitry and associated software. The electronic circuitry of the ECU includes a data processor for processing sensor data captured by the first biometric sensor. The first biometric sensor captures first sensor data representative of an identity of a user of the remote device. The ECU, responsive to processing by the data processor of the captured first sensor data, determines whether the identity of the user of the remote device matches an authorized user of a vehicle. Authorized users of the vehicle are authorized to access an interior of the vehicle. The ECU, responsive to determining that the identity of the user of the remote device matches an authorized user of the vehicle, unlocks a door of the vehicle to allow the identified authorized user to access the vehicle. The system also includes a second biometric sensor disposed in the vehicle. With the identified authorized user in the vehicle, the second biometric sensor captures second sensor data representative of an identity of the authorized user. The ECU, via processing by the data processor of the captured second sensor data, determines whether the identity of the identified authorized user of vehicle matches an authorized operator of the vehicle. The ECU, responsive to determining that the identity of the authorized user matches an authorized operator of the vehicle, performs one of the following: (i) starts the vehicle, (ii) maneuvers the vehicle, and (iii) performs a self-drive function of the vehicle.

These and other objects, advantages, purposes and features of the present invention will become apparent upon review of the following specification in conjunction with the drawings.

DESCRIPTION OF THE PREFERRED EMBODIMENTS

Figure 1:
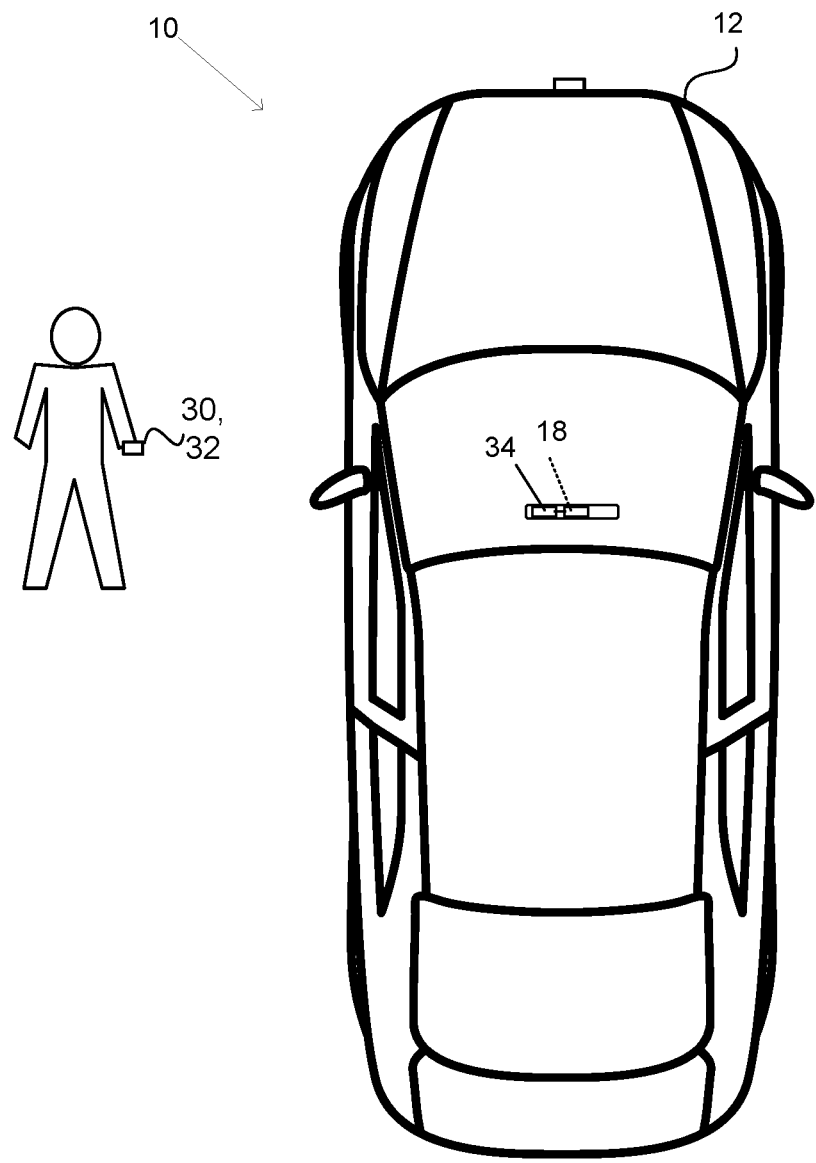
FIG. 1 is a plan view of a vehicle with a vehicular control system in accordance with the present invention.

A vehicular control system or security system 10 of a vehicle 12 operates to secure entry and/or operation of the vehicle and/or provide access to the vehicle (FIG. 1). The security system includes a remote device such as a remote key fob 30. A user may operate the key fob (e.g., actuate a user input on the key fob) to provide access to the vehicle (e.g., lock and/or unlock one or more doors of the vehicle). The user may also operate additional functions of the vehicle via the key fob. For example, the user may open the trunk of the vehicle, remote start the vehicle, operate the windows of the vehicle (i.e., roll the windows up or down), activate a horn of the vehicle, etc. The key fob may also be used to perform a self-drive function of the vehicle such as a remote back-up function where the user actuates an input and the vehicle reverses linearly, reverses while tracking the location of the key fob, or otherwise autonomously drives in a controlled fashion with the user of the key fob outside of the vehicle.

Implementations herein provide a vehicular control system for allowing access to the cabin of a vehicle (unlocking the doors) or enabling a function of the vehicle (such as operating a remote start system) and starting a vehicle once access has been granted to the cabin of the vehicle using biometric systems such as a fingerprint scanner and/or voice recognition or facial recognition systems and/or portions of advanced driver assistance systems (ADAS) such as driver monitoring systems and/or cabin monitoring systems to provide additional security against theft or other unauthorized access to or use of the vehicle.

Generally, a driver or user gains access to a vehicle or operates a function of the vehicle via a key or key fob without any other barrier ensuring that the particular person using the key or operating the key fob is authorized by the owner of the vehicle to do so. However, keys and key fobs are easily lost or displaced, and can be stolen or mistaken as belonging to someone with a similar looking key fob. In other words, a standard key fob generally grants unhindered access to a vehicle, but can easily come into the possession of someone the owner of the vehicle may not wish to access or operate the vehicle (such as an underage child or thief). Additionally, an owner of a vehicle may wish to grant access to their vehicle without allowing the person they granted access to being able to also operate the vehicle (such as someone who the driver allows to retrieve or an item from or deposit an item in the vehicle but does not allow to drive the vehicle). Thus, it is desirable to provide a system capable of authenticating or matching the identify of a key fob user as one authorized to gain access to and/or operate the vehicle.

The remote key fob 30 includes a biometric sensor 32 to authenticate that the user of the remote key fob is an authorized user. The biometric sensor 32 captures sensor data and transmits the sensor data to a control or electronic control unit (ECU) 18 having electronic circuitry and associated software, with the ECU 18 including a data processor that is operable to process the sensor data captured by the biometric sensor. The ECU processes the sensor data captured by the biometric sensor and, responsive to processing the sensor data captured by the biometric sensor, the system determines whether the user is an authorized user. If the system determines that the user is an authorized user, the system operates the desired function of the vehicle.

The key fob 30 and biometric sensor 32 may comprise any suitable configuration. For example, the remote key fob includes a fingerprint sensor. When the user wishes to operate a function of the vehicle via the remote key fob, the user may first authenticate themselves via the fingerprint sensor on the remote key fob. For example, the key fob may include actuatable buttons to perform locking, unlocking, remote start, trunk opening, or other functions of the vehicle. The fingerprint sensor may be a separate component of the key fob, where prior to the actuatable buttons being operable, a user must allow the fingerprint sensor to read their fingerprint and authenticate the user's identity as an authorized user. Alternatively, the fingerprint sensor can be integrated into a functional button of the key fob. A fingerprint sensor may be integrated into one or more of the buttons (as desired) and may read the user's fingerprint when the respective button is actuated. For example, a fingerprint sensor is integrated into an unlock button on the key fob, but not the lock button so that to unlock the vehicle, a user of the key fob must be an authorized vehicle, but to lock the vehicle, the user need not be authorized. Other biometric sensors may be used instead. For example, a voice recognition sensor or face sensor or iris/retina sensor may also or otherwise be used to biometrically authenticate the user of the remote key fob.

In some examples, the remote key fob is a user's mobile electronic device or smart phone. In those examples, the user activates a function of the vehicle via their mobile device (e.g., via an application) and the mobile device authenticates the user through a biometric sensor of the mobile device such as through a fingerprint sensor capability of the device or facial recognition software and a front facing camera of the mobile device.

The security system 10 includes the ECU 18 with the data processor that is operable to process the sensor data captured by the biometric sensor, whereby the ECU may authenticate the user based on the processed sensor data. For example, the ECU may access a database or other collection of data (e.g., via non-volatile memory disposed at the mobile device or the vehicle or via wireless communication) to determine whether the biometric data provided by the user matches the biometric information of an authorized user. The ECU may further include an image processor to process images captured, such as via a front facing camera of a mobile device functioning as a key fob, to provide facial recognition capabilities. The data transfer or signal communication from the sensor to the ECU may comprise any suitable data or communication link. The ECU may be located at the vehicle or within the key fob or mobile device functioning as a key fob. For example, the system may be an application on a user's mobile device that utilizes the mobile device's electronic circuitry and the software of the application to authenticate the user's identity and operate a function of the vehicle.

Figure 2:
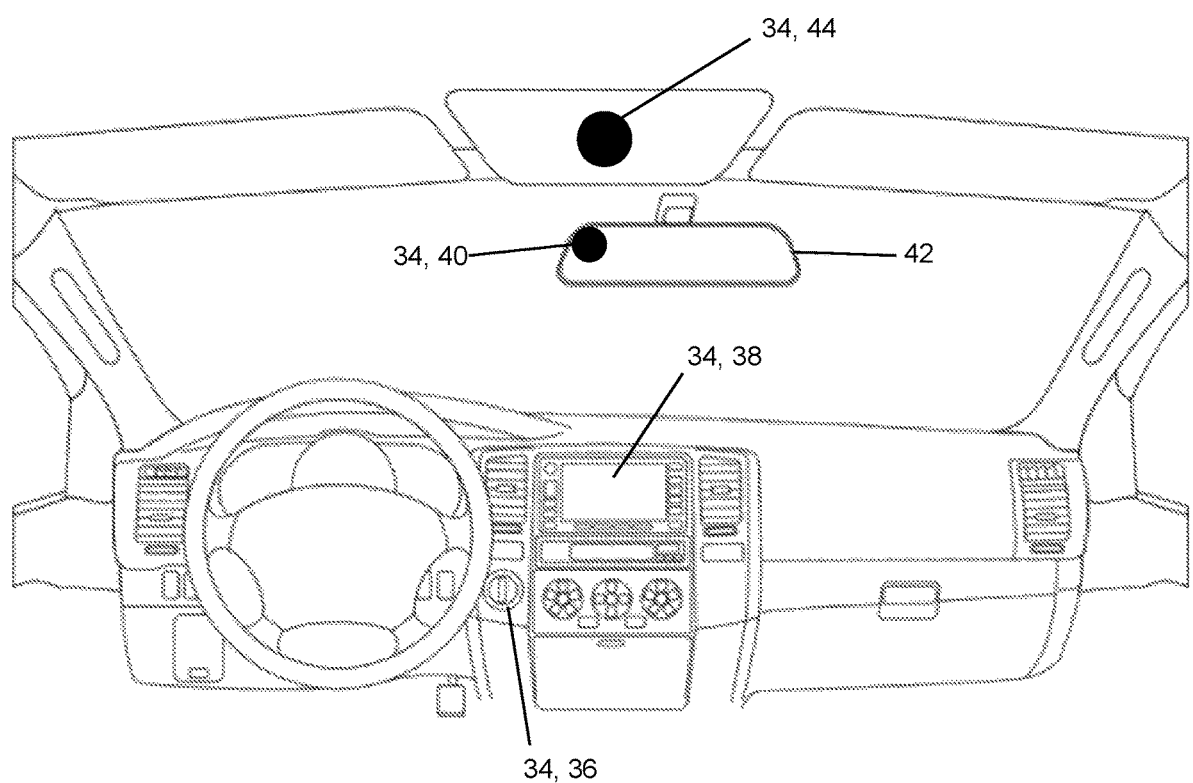
FIG. 2 is a perspective view of an interior of the vehicle of FIG. 1 with the second biometric sensor disposed within the vehicle.

Optionally and as shown in FIG. 2, the vehicular security system includes a second biometric sensor 34 disposed within the vehicle. A driver or operator of the vehicle may have to satisfy the second biometric sensor prior to driving or operating the vehicle. For example, the vehicle may include a fingerprint sensor disposed within the cabin of the vehicle. The driver may authenticate themselves by holding a finger against the fingerprint sensor in order to start the vehicle, shift the vehicle out of park, move the vehicle, etc. For example, the ignition of the vehicle 36 may be operable via a push button and the second biometric sensor 34 may be a fingerprint sensor integrated with the push button so the fingerprint sensor reads a user's fingerprint as they push the ignition button 36 to turn the vehicle on. Therefore, an authorized user may enter the vehicle and turn the vehicle on using the push button. The second biometric sensor reads the user's fingerprint when they press the ignition button 36, the system recognizes and/or authenticates the authorized user via the fingerprint, and allows the vehicle to turn on. If the fingerprint of the user is not recognized or authenticated by the system, the vehicle is not allowed to turn on. Thus, an authorized user of the vehicle may not even notice the intermediary step of the system reading and authenticating their fingerprint before turning on the vehicle as no additional or different step of turning on the vehicle is required to be performed by the user.

The second biometric sensor may comprise any other suitable configuration, such as a fingerprint sensor disposed elsewhere in the vehicle (such as a gear selector, a position on the dashboard, a touchscreen display 38, etc.) or the key fob may require a second biometric input from the driver of the vehicle. For example, the key fob, once inserted into the ignition of the vehicle, may prompt the driver to allow the finger print scanner to scan the driver's finger a second time, such as to ensure that the user who provided biometric data to access the vehicle is also the authorized user intending to drive the vehicle.

In another example, the vehicle may include a camera 40 disposed within the cabin of the vehicle (such as in a headliner, flip down visor, interior rearview mirror assembly 42, etc.) with a field of view including the driver's face. The camera 40 may be a dedicated camera for the purpose of authenticating the user of the vehicle or the camera 40 may be a driver monitoring camera that is part of a driver or occupant monitoring system. The camera 40 may capture images of the driver's face for facial recognition software contained within the circuitry of the ECU to authenticate the driver. In those embodiments, the ECU further includes an image processor for processing image data captured by the camera. In another example, the second biometric sensor may be an iris or retinal scanner or a microphone 44 capturing audio data for voice recognition capabilities. An iris or retinal scanner may be located anywhere within the interior cabin of the vehicle with a field of view including the driver's face or the iris or retinal scanner may be integrated with the camera 40. A microphone 44 may be a dedicated microphone for the purposes of voice recognition or may be integrated with a microphone of the vehicle such as one used for providing voice commands to an infotainment system or for conducting hands free phone calls.

The vehicular security system may maintain a first list of authorized users of the remote key fob (such as a list of users stored in memory disposed at the vehicle). The vehicular security system, responsive to processing of biometric data collected by the biometric sensor, determines that an identity of the user of the remote key fob matches an identity of one of the identities on the list of authorized users of the remote key fob. The vehicular security system may maintain a second list of authorized drivers of the vehicle (such as a list of authorized drivers stored in memory in the vehicle). The vehicular security system, responsive to processing of biometric data collected by the second biometric sensor, determines that an identity of the driver of the vehicle matches an identity of one of the identities of the list of authorized drivers of the vehicle. The list of identities of authorized drivers of the vehicle may be the same or may be different than (such as a subset of) the list of authorized users of the remote key fob. The list of authorized drivers and authorized users (whether the same or different) can be programmed or edited by another authorized person, such as via an input within the vehicle, at the key fob, at an application of a mobile phone, or any other suitable method in communication with the present system.

Thus, the system may store in memory and maintain a list of users authorized to access an interior of the vehicle (e.g., by unlocking doors, rolling down windows, opening a trunk, etc.) and a separate list of users authorized to operate the vehicle (e.g., start the engine, manually maneuver the vehicle, command the vehicle to autonomously or semi-autonomously maneuver, etc.). For example, a child of an owner of a vehicle may be authorized to access the interior of the vehicle but not authorized to operate the vehicle. The system may determine whether the user is on either or both lists simultaneously (e.g., when the user operates the remote device to unlock the doors of the vehicle). Alternatively, the system may determine whether a user is authorized to access the interior of the vehicle prior to the user gaining access to the interior of the vehicle and, after the user has gained access to the vehicle, determine whether the user (or other occupant of the vehicle) is authorized to operate the vehicle. For example, a second biometric sensor disposed within the cabin of the vehicle may gather additional biometric information to determine whether the user who requested access to the vehicle is the same user who is requesting to operate the vehicle. In some examples, the system may determine whether the authorized operator is present anywhere within the vehicle (e.g., an authorized operator may supervise the operation of the vehicle by an unauthorized operator). In other examples, the system may determine whether the person sitting in the driver's seat of the vehicle is an authorized operator.

Optionally, the system may require a second form of authentication in addition to the biometric information. For example, the system may prompt for a password (e.g., input via a touch screen or the mobile device) or a spoken phrase (e.g., captured by a microphone of the vehicle or mobile device) that is associated with the provided biometric information prior to allowing operation of the vehicle (or other vehicle functions).

Thus, the vehicular security system provides additional security of the vehicle by authenticating the identity of users and/or drivers of the vehicle. The remote key fob may only operate functions of the vehicle after authenticating the identity of the user via a biometric sensor. The biometric sensor at the key fob may be a finger print sensor, voice recognition capability, facial recognition capability, or the like. Multiple people may be authorized to access and/or use the vehicle (e.g., additional people within a single family may be authorized). Optionally, the vehicular security system may restrict or stop under-aged children from using or operating the vehicle without parental consent. Optionally, the different users may be authorized for different uses or functions of the vehicle, and/or the vehicle may operate differently for different users at different times (e.g., the vehicle may have limits on acceleration and speed or the like for an authorized teenage driver or certain users may have time limitations on when they are authorized to use the vehicle). The vehicular security system may include a second biometric sensor as an additional security measure. Therefore, in the case that an unauthorized user (or an authorized user who is not an authorized driver) gains entry to the vehicle, the vehicle is still secure. The second biometric sensor may be a fingerprint sensor, driver-viewing camera, retina scanner, or the like. One or more identities may be authorized to drive the vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 10,065,574; 10,017,114; 9,405,120 and/or 7,914,187, and/or U.S. Publication Nos. US-2020-0202151; US-2020-0143560; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 17/249,937, filed Mar. 19, 2021, and/or U.S. provisional application Ser. No. 63/200,451, filed Mar. 8, 2021, and/or U.S. provisional application Ser. No. 63/200,315, filed Mar. 1, 2021, and/or U.S. provisional application Ser. No. 63/200,003, filed Feb. 9, 2021, and/or U.S. provisional application Ser. No. 63/199,918, filed Feb. 3, 2021, and/or U.S. provisional application Ser. No. 63/198,372, filed Oct. 14, 2020, and/or U.S. provisional application Ser. No. 62/706,707, filed Sep. 4, 2020, and/or U.S. provisional application Ser. No. 63/011,360, filed Apr. 17, 2020, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular security system, the vehicular security system comprising:
   an electronic control unit (ECU) disposed in a vehicle equipped with the vehicular security system, the ECU comprising electronic circuitry and associated software;
   a remote device, wherein the remote device comprises a first biometric sensor, and wherein the remote device comprises a portable device;
   wherein the electronic circuitry of the ECU comprises a data processor for processing sensor data captured by the first biometric sensor;
   wherein, with the remote device exterior of the vehicle, the first biometric sensor captures first biometric sensor data representative of an identity of a user of the remote device;
   wherein the ECU, via processing by the data processor of the captured first biometric sensor data, determines whether the identity of the user of the remote device matches an authorized user of the vehicle, and wherein authorized users of the vehicle are authorized to access an interior of the vehicle;
   wherein the ECU determines whether the identity of the user of the remote device matches an authorized user of the vehicle by comparing the captured first biometric sensor data to identity data associated with a plurality of authorized users, and wherein the identity data associated with the plurality of authorized users is stored in memory;

wherein the ECU, responsive to determining that the identity of the user of the remote device matches an authorized user of the vehicle, unlocks a door of the vehicle to allow the identified authorized user to access the vehicle;

a second biometric sensor disposed within an interior portion of the vehicle, wherein the second biometric sensor comprises a driver monitoring camera of a driver monitoring system and an occupant monitoring system of the vehicle, and wherein the driver monitoring camera is disposed in an interior rearview mirror assembly of the vehicle, and wherein the driver monitoring camera views the face of an operator of the vehicle;

wherein, following the ECU unlocking the door of the vehicle to provide access to allow the identified authorized user to access the vehicle, and with the identified authorized user in the vehicle, the second biometric sensor captures second biometric sensor data representative of an identity of the authorized user, and wherein the second biometric sensor data is different than the first biometric sensor data, and wherein the second biometric sensor captures biometric information that is different than biometric information captured by the first biometric sensor;

wherein the ECU, via processing by the data processor of the captured second biometric sensor data, determines whether the identity of the identified authorized user of the vehicle matches an authorized operator of the vehicle;

wherein the ECU determines whether the identity of the identified authorized user of the vehicle matches an authorized operator of the vehicle by comparing the captured second biometric sensor data to identity data associated with a plurality of authorized operators, and wherein the identity data associated with the plurality of authorized operators is stored in memory;

wherein the ECU, responsive to determining that the identity of the authorized user matches an authorized operator of the vehicle, allows the authorized operator to operate the vehicle; and wherein the ECU, responsive to determining that the identity of the authorized user does not match an authorized operator of the vehicle, does not allow operation of the vehicle.

2. The vehicular security system of claim 1, wherein the first biometric sensor comprises one selected from the group consisting of (i) a fingerprint sensor, (ii) a voice recognition sensor, and (iii) a facial recognition camera.

3. The vehicular security system of claim 1, wherein the remote device comprises a mobile phone.

4. The vehicular security system of claim 1, wherein the second biometric sensor comprises one selected from the group consisting of (i) a fingerprint sensor, (ii) a voice recognition sensor, and (iii) a facial recognition camera.

5. The vehicular security system of claim 1, wherein the second biometric sensor comprises a fingerprint sensor at an ignition button of the vehicle.

6. The vehicular security system of claim 1, wherein the remote device comprises a smart phone of the user.

7. The vehicular security system of claim 1, wherein the ECU, responsive to determining that the identity of the authorized user matches an authorized operator of the vehicle, starts the vehicle.

8. The vehicular security system of claim 1, wherein the authorized operator is seated in a passenger seat of the vehicle, and wherein an unauthorized operator is seated in the driver's seat of the vehicle, and wherein the ECU, responsive to determining that the person sitting in the passenger seat of the vehicle is the authorized operator of the vehicle, allows the unauthorized operator seated in the driver's seat of the vehicle to operate the vehicle.

9. The vehicular security system of claim 1, wherein the plurality of authorized users is different than the plurality of authorized operators.

10. The vehicular security system of claim 9, wherein the plurality of authorized operators is a subset of the plurality of authorized users.

11. The vehicular security system of claim 1, wherein the ECU allows the authorized operator to operate the vehicle after obtaining additional authentication associated with the second biometric sensor data.

12. The vehicular security system of claim 11, wherein the additional authentication comprises at least one selected from the group consisting of (i) a password and (ii) a spoken passphrase.

13. A method for controlling access of a vehicle, the method comprising:

receiving, at an electronic control unit (ECU) of a vehicle, a request to access the vehicle, wherein the request to access the vehicle comprises first biometric sensor data representative of an identity of a user, and wherein the first biometric sensor data is received from a remote device comprising a first biometric sensor, the first biometric sensor capturing the first biometric sensor data;

determining, by the ECU, based on the first biometric sensor data, whether the user is authorized to access the vehicle by comparing the first biometric sensor data to identity data associated with a plurality of authorized users, wherein the identity data associated with the plurality of authorized users is stored in memory;

responsive to determining that the user is authorized to access the vehicle, operating, by the ECU, a first function of the vehicle, wherein the first function is associated with granting access to the vehicle;

receiving, at the ECU from a second biometric sensor disposed within an interior portion of the vehicle, a request to operate the vehicle, wherein the second biometric sensor comprises a driver monitoring camera of a driver monitoring system and an occupant monitoring system of the vehicle, and wherein the driver monitoring camera is disposed in an interior rearview mirror assembly of the vehicle, and wherein the driver monitoring camera views the face of an operator of the vehicle, and wherein the request to operate the vehicle comprises second biometric sensor data representative of an identity of an occupant of the vehicle, and wherein the second biometric sensor data is different than the first biometric sensor data, and wherein the second biometric sensor captures biometric information that is different than biometric information captured by the first biometric sensor;

determining, by the ECU, based on the second biometric sensor data, whether the occupant of the vehicle is authorized to operate the vehicle by comparing the second biometric sensor data to identity data associated with a plurality of authorized operators, wherein the identity data associated with the plurality of authorized operators is stored in memory; and responsive to determining that the occupant is authorized to operate the vehicle, operating, by the ECU, a second function of the vehicle, wherein the second function is associated with starting and/or maneuvering the vehicle.

14. The method of claim 13, wherein the remote device comprises a remote portable device of the user, and wherein the first biometric sensor comprises a fingerprint sensor disposed on the remote portable device of the user.

15. The method of claim 13, wherein the first function comprises unlocking a door of the vehicle.

16. The method of claim 13, further comprising, responsive to determining that the occupant is not authorized to operate the vehicle, refusing, by the ECU, to operate the second function of the vehicle.

17. The method of claim 13, wherein the remote device comprises a smart phone of the user, and wherein the second biometric sensor comprises a driver monitoring camera of a driver monitoring system of the vehicle.

18. A vehicular security system, the vehicular security system comprising:

an electronic control unit (ECU) disposed in a vehicle equipped with the vehicular security system, the ECU comprising electronic circuitry and associated software;

a user device, wherein the user device comprises a first biometric sensor;

wherein the electronic circuitry of the ECU comprises a data processor for processing sensor data captured by the first biometric sensor;

wherein, with the user device exterior of the vehicle, the first biometric sensor captures first biometric sensor data representative of an identity of a user of the user device;

wherein the ECU, via processing by the data processor of the captured first biometric sensor data, determines whether the identity of the user of the user device matches an authorized user of the vehicle, and wherein authorized users of the vehicle are authorized to access an interior of the vehicle;

wherein the ECU determines whether the identity of the user of the user device matches an authorized user of the vehicle by comparing the captured first biometric sensor data to identity data associated with a plurality of authorized users, and wherein the identity data associated with the plurality of authorized users is stored in memory;

wherein the ECU, responsive to determining that the identity of the user of the user device matches an authorized user of the vehicle, controls a first function of the vehicle, wherein the first function provides access to the vehicle;

a second biometric sensor disposed within an interior portion of the vehicle, wherein the second biometric sensor comprises a driver monitoring camera of a driver monitoring system and an occupant monitoring system of the vehicle, and wherein the driver monitoring camera is disposed in an interior rearview mirror assembly of the vehicle, and wherein the driver monitoring camera views the face of an operator of the vehicle, and wherein, following the ECU controlling the first function of the vehicle to provide access to the vehicle, the second biometric sensor captures second biometric sensor data representative of an identity of an occupant of the vehicle, and wherein the second biometric sensor data is different than the first biometric sensor data, and wherein the second biometric sensor captures biometric information that is different than biometric information captured by the first biometric sensor;

wherein the ECU, via processing by the data processor of the captured second biometric sensor data, determines whether the identity of the occupant of the vehicle matches an authorized operator of the vehicle, and wherein authorized operators of the vehicle are authorized to operate the vehicle;

wherein the ECU determines whether the identity of the identified authorized user of the vehicle matches an authorized operator of the vehicle by comparing the captured second biometric sensor data to identity data associated with a plurality of authorized operators, and wherein the identity data associated with the plurality of authorized operators is stored in memory; and wherein the ECU, responsive to determining that the identity of the occupant of the vehicle matches an authorized operator of the vehicle, controls a second function of the vehicle that allows the authorized operator to operate the vehicle.

19. The vehicular security system off claim 18, wherein the user device comprises a mobile phone.

* * * * *